Oct. 13, 1959   C. A. HEILAND ET AL   2,908,866
MEASURING APPARATUS
Filed April 29, 1955   2 Sheets-Sheet 1
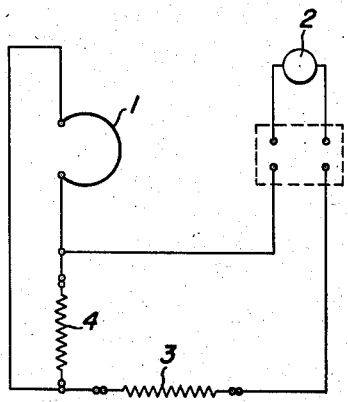
FIG. 1
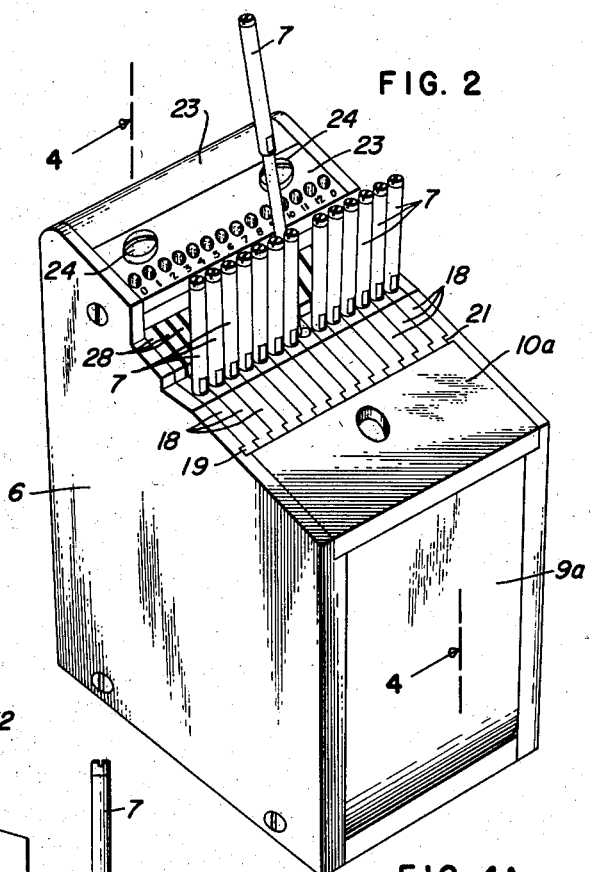
FIG. 2
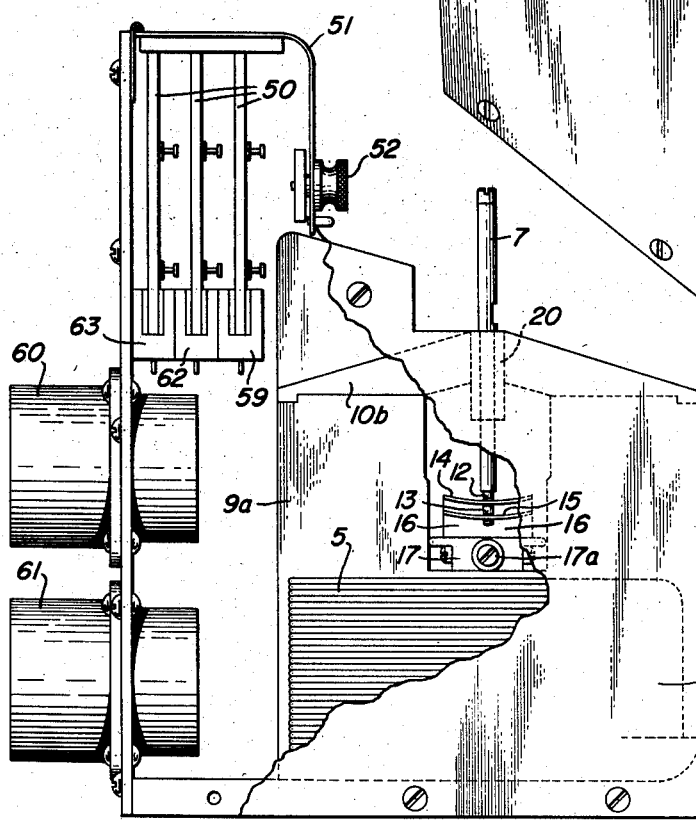
FIG. 3
FIG. 4A
INVENTORS.
C. A. HEILAND
R.F. McCAMMON
BY Arthur H. Swanson
ATTORNEY.

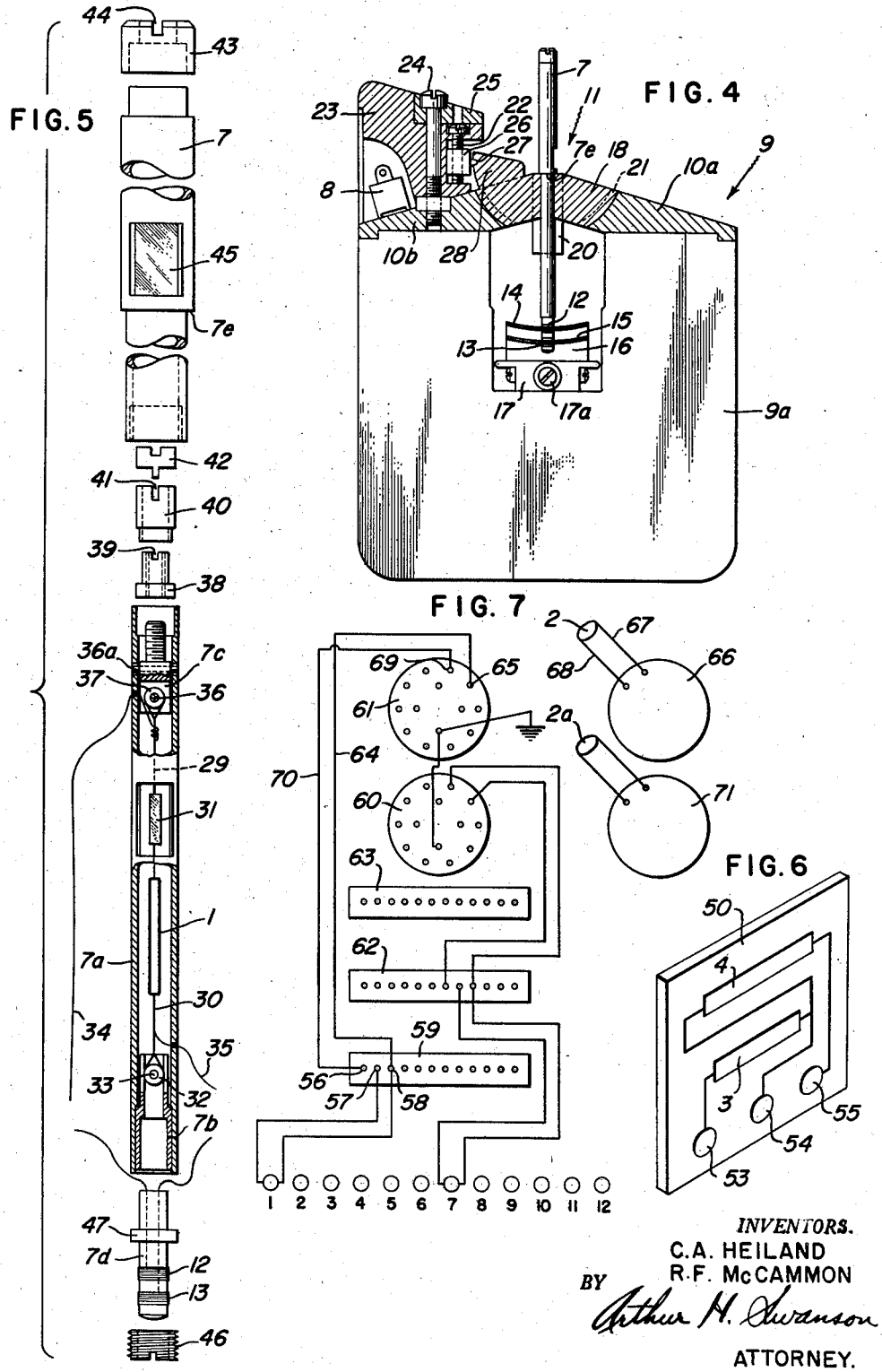

2,908,866
MEASURING APPARATUS

Carl A. Heiland and Robert F. McCammon, Denver, Colo., assignors to Minneapolis-Honeywell Regulator Company, Minneapolis, Minn., a corporation of Delaware Application April 29, 1955, Serial No. 504,744

7 Claims. (Cl. 324—97)

An object of our present invention is to provide an improved d'Arsonval type of multiple galvanometer which is adapted for general usage and is especially suitable for multichannel-oscillography. Our improved multiple galvanometer is characterized by its greater compactness, adjustability and adaptability than has heretofore been attainable. These advantages are due to a novel arrangement of a plurality of elongated galvanometer coil assemblies or elements of so-called pencil type in a common magnetic field of high intensity and constancy, with suitable provision for readily and easily removing and replacing the coil elements and effecting desired changes or adjustments in their calibrations.

An important object of our invention is to provide an improved multiple galvanometer of the type described which is superior to multiple galvanometers of known type in respect to the elimination of the customary built-in pole pieces. This permits the adjustment of each galvanometer individually as a whole without twisting of the upper part of the coil suspension. To that end, the pole pieces, into which the galvanometer coil elements are inserted and frictionally retained, are an integral portion of the magnet bank. Consequently, each galvanometer spot on the film can readily be positioned vertically and horizontally, and any galvanometer can be easily removed from the magnet bank without disturbing the magnetic field, i.e. sensitivity and damping of adjacent units. In accordance with our invention, such operations are facilitated by terminating the coil connections to a slip-ring assembly provided at the bottom of the galvanometer element and for which a corresponding collector assembly is provided in the bottom of the magnet bank.

Aside from contributing to and making possible improvements in adjustability and adaptability, these novel features of our invention, in an apparatus embodiment thereof, have made it possible to construct oscillograph-galvanometers substantially smaller than those heretofore known and available. By way of example, it has been possible to effect such a degree of miniaturization by the use of our present invention that the oscillographic recorder space formerly occupied by six recording channels can now accommodate twelve. Moreover, such miniaturization has been accompanied by a desirable increase in current sensitivity and improvement in frequency response.

Another object of our invention is to provide an improved method of matching the galvanometers to the external input-signal circuits by means of a printed circuit card (hereinafter called circuit-matching panel) which carries a portion of the input circuit providing ready access to series or shunt resistors which may be used to adjust the external circuitry to the resistance required for proper operation in respect to sensitivity and damping. The circuit-matching panels preferably are of the plug-in type and each includes the customary series and parallel resistors for connection to an associated galvanometer coil element. In accordance with our present invention, the circuit-matching panels are arranged to be available from the top of the magnet bank. This facilitates their removal, adjustment and replacement, or the substitution of another circuit-matching panel.

A further object of our invention is to provide an improved multiple galvanometer of the character described in which the galvanometer input connector or plug is integral with the magnet assembly. Thus, the connections of the galvanometer magnet bank to the driving sources, transducers, bridges or other analog voltages to be measured and recorded are made with a molded plug connector which forms an integral part of the magnet bank. This arrangement facilitates the use, removal and replacement of the galvanometer magnet bank as a unit, and otherwise contributes to the desired end of attaining a maximum number of channels in a minimum of space.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Of the drawings:

Fig. 1 is a diagram of an individual and typical galvanometer circuit embodied in our multiple galvanometer.

Fig. 2 is an external perspective view of a galvanometer magnet bank according to our invention;

Fig. 3 is a side view of a preferred form of our multiple galvanometer magnet bank assembly with a portion of the casing broken away and showing the relationship of the galvanometer magnet bank, a heater therefor, the input connectors or plugs, and the circuit-matching panels;

Fig. 4 is a sectional view along the lines 4—4, Fig. 2, showing the manner in which the galvanometer coil elements are adjustably positioned in a common magnetic field;

Fig. 4A is a perspective view of convex-shaped pole piece members embodied in the galvanometer magnetic bank;

Fig. 5 shows an exploded view of a preferred form of galvanometer coil element;

Fig. 6 is a perspective view of a preferred form of the circuit-matching printed circuit panel; and Fig. 7 is a wiring diagram of our multiple galvanometer showing the electrical connections to the galvanometer coils, the circuit-matching panels, the input connector or plug, and to the analog voltage sources under measurement.

There is illustrated in Fig. 1 a typical galvanometer circuit which may advantageously be employed in the multiple galvanometer of our invention. It is contemplated that this circuit is typical of each of the galvanometer circuits arranged within the multiple galvanometer magnet bank. Each galvanometer element consists of an elongated coil 1 suitably suspended in a magnetic field. Connection to the galvanometer coil from an analog voltage source under measurement, indicated at 2, is made through a suitable molded plug or other connector encased in a dotted outline and on which the number of the galvanometer channel may be suitably marked. Ordinarily, both terminals on the connector to which the galvanometer coils are connected are isolated from the galvanometer magnet bank, and thereby from ground, and from the other channels. The galvanometer damping resistors are illustrated at 3 and 4. Resistor 3 is a so-called "series" resistor and resistor 4 is a "parallel" resistor. As is explained hereinafter, these damping resistors preferably are formed on a printed circuit strip panel which is removably associated with the galvanometer element and the magnet bank. With this arrangement, it is evident that desired changes in the galvanometer circuit-matching and damping may readily be effected by the removal of a printed circuit panel and the substitution of another including damping resistors of suitable value.

Figs. 2 and 3 show a magnet bank of our improved design. This magnet bank is shown as accommodating twelve galvanometer elements each including a tubular, unitary coil assembly and two adjustable means for producing reference traces. Preferably, this magnet bank is equipped with internal, thermostatically controlled, flat, electric heater elements 5 of known type which are disposed on opposite sides of the bank, between the bank and the enclosing metallic or other casing 6. Both heater elements are arranged for connection to an energizing source of alternating current through a suitable thermostat indicated at 8 in Fig. 4. When energized, the heater elements are effective after a relatively short time interval to maintain the temperature of the magnet bank constant at a temperature, for example of 120° F., notwithstanding varying and unpredictable changes in the ambient temperature, and thus serve a galvanometer stabilizing purpose. Further reference to the thermostatically controlled electric heater need not be made herein inasmuch as the details form no part of our present invention.

In order to permit each of the twelve galvanometer coil assemblies to be adjusted individually as a whole, and without twisting the suspension, and also to permit easy removal and replacement of the galvanometer coil assemblies, the built-in pole pieces such as are customarily associated with galvanometer coils in prior art constructions have been eliminated. Each of the individual galvanometer coil assemblies of our improved construction comprises a metallic tube 7 positioned in a magnetic field provided by a magnet structure 9 in the manner illustrated in Fig. 4. The galvanometer coil or current carrying element 1 is suitably suspended, as is illustrated in Fig. 5 in the tube 7 for oscillatory movement in the magnetic field. All of the galvanometer tubes 7 are arranged in the same plane as may be seen by reference to Figs. 2 and 3.

The magnet structure 9 includes a U-shaped Alnico V block 9a and associated pole piece members 10a and 10b and made of suitable magnetic material such as iron. The pole piece members 10a and 10b are suitably attached to the magnetic block 9a. Preferably, the members 10a and 10b are keyed to the block 9a as at the depending remote edges to assure a desired relationship between the said members and block.

Associated with the pole piece members 10a and 10b are a plurality of manually adjustable pole piece mechanisms indicated at 11. A mechanism 11 is associated with each galvanometer assembly for permitting adjustment in its vertical position and thereby vertical adjustment in the position of the light beam reflected by the galvanometer mirror. The insertion and removal of each galvanometer in the magnet bank are facilitated by bringing out the terminals of each galvanometer coil to the bottom of its associated tube to a slip-ring assembly comprising electrically conductive slip-rings 12 and 13, as seen in Fig. 4. The corresponding collector assembly comprises electrically conductive collector brushes 14 and 15 mounted on a suitable insulating member 16. A separate collector brush 14 or 15 mounted on an individual member 16 is associated with each of the galvanometer coil and tube elements. The members 16, in turn, are attached by suitable screw means 17a to an elongated T-shaped member 17 which is cemented or otherwise attached to the bottom of the magnetic block 9, that is, to the upper surface of the portion connecting the leg members. Alignment of the collector brushes 14 and 15 with the galvanometer tube slip-rings is accomplished by the edge 7e on the associated galvanometer tube and which abuts on the upper surface of pole piece mechanisms 11.

For the purpose of facilitating desired vertical adjustment of each galvanometer, the pole piece mechanisms 11 are each provided with an arcuate or convex-shaped pole-piece segment indicated at 18, a perspective view of which is shown in Fig. 4A. The inner surfaces of magnetic members 10a and 10b are of complementary concave shape to receive the convex-shaped pole-piece segments 18. Extending downwardly from opposite sides of each pole-piece segment 18 are relatively short rectangular plate members 20 between which the galvanometer tube 7 is adapted to be inserted. Members 20 serve as a guide and also as frictionally retaining members for the galvanometer tube. As shown, each curved pole-piece segment is provided with an offset circumferential portion indicated at 19 which mates with similar offset portions in adjacent curved pole piece portions and to the enclosing casing as at 21, Fig. 2. This construction serves to lock the curved pole-piece segments together and to the casing although permitting relative rotatory movement. There is also provided in association with each mechanism 11 an adjusting screw 22. Rotation of the screw 22 as by means of a screw driver inserted into a kerf at the top is effective to rock the curved pole-piece segment 18 clockwise or counterclockwise. In this way the galvanometer tube may be tilted to accomplish the desired vertical spot adjustments of the galvanometer.

To this end, the adjusting screws 22, as shown, are carried by a supporting member 23 which extends entirely across the galvanometer bank and serves the same adjusting screw supporting function for all of the twelve galvanometers. Member 23, in turn, is supported by the pole piece 10b and is attached thereto by two spaced screws indicated by the numeral 24.

Upward movement of the adjusting screws 22 is prevented by a plate 25 which is perforated to permit access by means of a screw driver to each of the screws 22. Downward movement of the screws 22 is prevented by the member 23 into which the screws are suitably set. Each of the screws 22 is in threaded engagement with a tubular member 26 from which there projects a short gear tooth 27. Gear tooth 27 engages a gear sector in the circumference of an extension 28 of an associated curved pole-piece segment 18, the center of the gear sector being the galvanometer mirror. Each extension 28 may be separately formed and suitably attached to its related pole piece, as by cementing.

With this arrangement, it is apparent that upon rotation of each of the adjusting screws 22, vertical and lateral motion thereof being restrained, the resultant vertical motion of the tubular member 26 and tooth 27 is effective to rock the associated curved pole piece assembly 18 and thereby produce vertical spot adjustment of the related galvanometer without introducing parallax.

Horizontal spot adjustment of each galvanometer may be readily effected by rotating each galvanometer tube as a whole. It is apparent that such adjustments may be made without twisting or otherwise modifying the suspension for the galvanometer coil. Thus, with our improved multiple galvanometer construction, both vertical and horizontal spot adjustments of each of the galvanometers may be made independently of the adjustment of any of the other galvanometers. In addition, removal and replacement of any or all of the galvanometers may be readily effected. This is a decided advantage in that the magnetic fields of the other galvanometers and therefore their calibrations are left unchanged.

A preferred form of galvanometer coil and tube element according to our invention is illustrated in Fig. 5. The galvanometer coil and tube assembly there shown consists of a non-magnetic tube or barrel 7a the lower end of which carries the slip rings 12 and 13. Within the tube is the galvanometer coil or oscillatory assembly including the elongated coil 1 which is supported for oscillation by suspension wires, filaments or ribbons 29 and 30 to which the ends of the coil are connected, as shown, so that the coil can be connected in circuit in the manner illustrated in Fig. 1. The suspension filament carries a mirror 31 to which deflections of the galvanometer coil 1 are imparted upon application to the coil of an analog voltage to be measured. Reflections of the mirror are in accord with the variations in the applied analog voltage.

When the multiple galvanometer of our invention is employed in the making of photographic oscillographic recordings, the galvanometer mirror 31 desirably is associated with a suitable optical system to provide a desired reflection and deflection of a light ray or beam in accordance with the applied analog voltage. The lower suspension filament 30 is connected to a spool 32 carried on an anchor pin 33 and also extends through a tubular member 7b, which is rigidly supported in the lower end of the tube 7a. A pig tail wire 35 connected to the lower suspension filament is connected to the slip ring 13, which as shown, is suitably mounted on an insulating member 7d. The top suspension filament 29 is connected by a pig tail 34 to the slip ring 12 which also is mounted on member 7d. The pig tail 34 is carried to the top suspension filament 29 through a groove on the outer surface of tube 7a.

The description of the connections of pigtails 34 and 35, and Figure 5, apply to electromagnetically damped galvanometers. In the fluid-damped galvanometers, pigtail 35 goes directly to one end of coil 1, and pigtail 34 goes directly to the other end of coil 1. In the case of fluid-damped galvanometers, the suspension filaments do not form part of the metallic circuit which conducts electricity through the coil 1.

The top suspension filament 29, as shown, is supported from a spool 37. The spool 37 is carried on an anchor pin 36 which extends horizontally through and vertically supports a cylindrical insulating member 7c. Insulating member 7c is supported from tube 7a by means of an alignment pin 36a which extends through mating, elongated openings in the members 7a and 7c. The upper portion of insulating member 7c is of narrower cross section than the lower portion and is threaded to receive an internally threaded adjustable nut 38. A kerf 39 is provided in the upper end of the nut 38 for providing a desired "factory" adjustment of the galvanometer, and in particular, an adjustment of the coil and suspension to the correct frequency and sensitivity. This adjustment is made by moving the suspension and the coil vertically relative to the shoulder 7e, and, consequently relative to the pole-piece mechanism 11 when the tube 7 is located in the mechanism 11.

In order to permit oscillatory adjustment of the inner tube 7a assembly from the exterior of tube 7, there is provided a tubular bias nut 40 which is rigidly attached to the member 7a. Cooperating with the kerf 41 in tubular nut 40 is a bias key 42 which permits oscillatory adjustment of the tubes 7 and 7a through the access hole in the uppermost cap 43 after assembly of tube 7a in outer tube 7. Member 43 is provided with a diametral kerf 44 into which a screw driver may be inserted for adjusting the position of the galvanometer coil and tube assembly as a whole. This eliminates the necessity for twisting or otherwise modifying the galvanometer suspension when it is desired to effect transverse or angular adjustment of the galvanometer element in the field. The tube 7 is a non-magnetic outer protecting tube which fits over the tube 7a. A transparent window 45 in tube 7 is positioned to be adjacent to the mirror 31 when the tubes are in their normal operative relationship. An externally threaded tubular terminal screw 46 at the lower end of the tube 7 abuts against a shoulder 47 on member 7d and cooperates with the internally threaded lower portion of the tube 7 to hold the assembly together.

As will be readily apparent, the galvanometer tube structure just described may be easily placed in and removed from the galvanometer magnet bank. It is necessary only to insert the galvanometer tube into the tube 20 provided in a galvanometer pole piece 18 until the shoulder 7e on the galvanometer tube 7 abuts against the upper surface of pole piece member 18. In this position, the galvanometer coil 1 is connected into an external electrical circuit, typical of which is that illustrated in Fig. 1. This connection is effected by the slip rings 12 and 13 and the associated corresponding collector brushes 14 and 15 carried by the insulating member 16.

Damping of the galvanometer is obtained in known manner and for example may be electromagnetic up to frequencies of 450 cycles per second. As is known, actual damping is dependent on the relation between galvanometer and source resistance, that is the resistance of the source 2 providing the analog voltage under measurement. Damping may be controlled by inserting parallel or series resistances as shown in Fig. 1. For use at higher frequencies, that is frequencies up to 5000 cycles per second and higher, fluid damping is desirable and may be accomplished in known manner by including a suitable damping fluid, such as Dow Corning 200 Silicone damping fluid, in the interior of the tube 7a, below the level of the opening of mirror 31. A preferred manner in which the galvanometer suspension may be so damped is described and claimed in the application of George J. Turre, Jr. and Arthur J. Ullrich, Jr., Serial No. 381,054 filed on September 18, 1953 and assigned to the same assignees.

For the purpose of facilitating matching of the multiple galvanometer to external circuits according to our invention, the desired parallel and series damping resistances preferably are formed on printed circuit panels or blanks such as are shown at 50 in Figs. 3 and 6. Referring to Fig. 6, the panel 50 is made of a suitable insulating material and is provided at its lower edge with three contacts. Connectors for the series and parallel resistors 3 and 4 may be suitably printed on the panel 50 and may be so arranged as to permit the easy insertion of and removal of series and parallel resistors of desirable value. If desired, the series and parallel resistors may be directly printed on the panel 50, as shown. Such printing may be done in known manner.

It will be apparent that circuit-matching panel 50 may be associated with each of the individual galvanometers provided in the magnet bank. If it should be desired to change to a different galvanometer requiring different series and/or parallel resistance, it is necessary only to remove the spring held cover 51 as seen in Fig. 3, as by pulling on the thumb nut 52. All of the circuit-matching panels 50 in the magnet bank are then exposed and any or all of them may easily be removed and replaced by another including series and parallel resistors of desired value. To facilitate such easy removal and replacement, the contacts 53, 54 and 55 provided at the bottom edge of each panel 50 are arranged for cooperation with similarly positioned contacts 56, 57 and 58, respectively, provided in receptacle 59 in the galvanometer magnet bank, as seen in Figs. 3 and 7. The mating contacts in the receptacle 59 are connected to the galvanometer input connectors 60 or 61 as is illustrated in Fig. 7. As shown, two additional receptacles 62 and 63 identical to receptacle 59 are also provided.

As those skilled in the art will understand, a number of sets of parallel and series resistors may be provided on each of the circuit-matching panels 50 instead of the single set shown. With such modification, a fewer number of circuit-matching panels 50 will then be required for use with each galvanometer bank. By this expedient, then, a further saving in space in each galvanometer bank may be effected.

The electrical diagram of Fig. 7 illustrates a preferred manner for connecting all of the different analog voltages under measurement to the multi-galvanometer assembly. Specifically, there are provided molded plug connectors 60 and 61 which, as shown in Fig. 3, are integral with the magnet bank assembly. This is an important feature in that the magnet bank assembly then is a unitary assembly having utility as such or it may be employed in a photographic recorder including other magnet bank assemblies. Our multiple galvanometer is particularly useful in such applications because of the compactness of the magnet bank assembly. This makes it possible to employ numerous such assemblies in a single recorder. Thus, it is feasible to employ as many as ten magnet bank assemblies in a recorder of ordinary dimensions, providing as many as one hundred and twenty channels and twenty reference traces. A desirable feature resulting from the unitary character of each magnet bank assembly is that the removal of a particular magnet bank for servicing may readily be effected and a replacement magnet bank assembly inserted in the recorder. The individual adjustability and adaptability of each galvanometer element contributes also in this connection.

The molded plug connectors 60 and 61 may be of the known A.N. type and are intended for association with corresponding male plugs for connection of each of a plurality of analog voltages to an associated and individual one of the galvanometer coils.

Fig. 7 illustrates the manner of connection of the first galvanometer and the seventh galvanometer of a magnet bank assembly to the molded plug connectors. It will be seen that the first six galvanometers in the bank are arranged for connection to the upper molded plug connector 61, while the last six galvanometers, including the seventh galvanometer, are connected to the lower molded plug 60. Specifically, the two terminals of the first galvanometer (that shown at the left end of the bank and marked 1 in Fig. 7) are connected to terminals 57 and 58 of the receptacle 59. The terminal 58 is also connected by a conductor 64 to a terminal 65 on the female molded plug 61. That terminal 65, as seen in Fig. 7, is adapted for connection to one terminal of a source of voltage indicated at 2 by means of the male molded plug 66 associated with the plug 61 and by means of a conductor 67. The second terminal of the source 2 is connected by a conductor 68 and the plug 66 to terminal 69 on the plug 61. The terminal 69 is connected by a conductor 70 to the terminal 56 on the receptacle 59.

The terminals 56, 57 and 58 are also adapted for connection by means of the printed circuit panels 50 thereby to provide the desired damping characteristic of the galvanometer. By reference to Fig. 6, it will be seen that the terminals 53 and 54 are arranged for connection by the series resistor 3 and the terminals 54 and 55 are arranged for connection by the parallel resistor 4. A circuit-matching panel with turret lugs can also be provided such that available resistors may be applied with a solder-bend. In other words, the terminals 54, 55 and 56 may be in the form of cylindrical lugs or posts projecting from the surface of panel 50 (as is best seen in Fig. 3) and having several diameters like a turret. Wire may be attached to such lugs by bending one or more turns of the wire around the perimeter of the lug and soldering the wire to the lug.

The connection of the seventh galvanometer to an associated analog voltage source 2a is similarly effected by way of the receptacle 62, the molded plug connector 60 and an associated male plug connector 71. The connection of all of the other galvanometers to an associated analog voltage source also is similarly effected. The connections on the first and seventh galvanometers are representative, and therefore, it is believed unnecessary to illustrate the connections of the other galvanometers to their associated analog voltage sources.

As is known in the art, the multi-galvanometer assembly herein described may be supplemented by a suitable recording arrangement, timing device, and manual, semi-automatic or automatic controls. It may also be provided with auxiliary apparatus such as visual monitoring and scanning, identification devices such as automatic record numbering, trace identifiers and coded reference traces, arrangements for the projection of grids and special scale and suitable recording chart drives. One form of photographic recorder with which the invention may advantageously be employed is illustrated in the Heiland Patent 2,535,065 which issued on December 26, 1950. When used in a recorder of that type, a photographic record of the oscillatory deflections of each of the galvanometer mirrors in the multi-galvanometer assembly may be obtained. By reason of the miniaturization effected in the multigalvanometer assembly of our present invention, records of up to 120 analog voltages may simultaneously be effected on a chart of the same width generally accommodating 24 or fewer recording channels in known types of oscillographic recorders. In other words, the galvanometer assemblies of this invention are so small and so efficient that five times as many records can be made in the same space as that required by the prior art galvanometers.

While, in accordance with the provisions of the statutes, we have illustrated and described the best form of the invention now known to us, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described our invention, what we claim as new and desire to secure by Letters Patent is as follows:

1. A multiple galvanometer, including: a plurality of similar, tubular, unitary, coil assemblies of circular, cross section; an elongated coil in each of said coil assemblies and supported for deflection between spaced points by suspension wires; a pair of slip-rings for each of said coils provided at one end of each of said coil assemblies; an individual pair of collector brushes each supported by said magnets and cooperatively related to one pair of slip-rings for connecting each of said coils to an external circuit; a magnet structure common to all of said coil assemblies; and means supporting said coil assemblies, comprising: a pair of spaced, magnetic members forming pole-pieces for said magnet structure; a first group of magnetic, pole-piece segments arranged side-by-side on one of said magnetic members in the space between said members; a second group of magnetic, pole-piece segments arranged in said space side-by-side on the other of said magnetic members with a pole-piece segment of said second group spaced from but disposed oppositely to an individually associated pole-piece segment of said first group to form a plurality of separate, magnetic gaps, one individual to each of said coil assemblies and in which the latter are inserted when in operative relationship with said magnet; the space between each of said oppositely disposed, magnetic segments comprising a circular opening of mating dimensions, whereby each of said coil assemblies snugly fits in and is frictionally retained in its associated opening; means supporting each of said oppositely disposed pairs of pole-piece segments to be independently adjustable in position about an axis parallel to a line connecting them; separate means for so adjusting each of said oppositely disposed pairs of pole-piece segments, and damping resistors for each of said coil assemblies mounted on an individual panel, each of said panels having plug-in type connecting means, and receptacle means for said panels, said receptacle means having mating connecting means and providing a connector from each individually associated coil assembly and panel to its separate, external circuit.

2. A multiple galvanometer as specified in claim 1 including plug-in type input connector means for all of said tubular unitary coil assemblies, said input connector means being operatively connected to said receptacle and including separate electrical contacts adapted for connection to a plurality of external circuits, and a casing for housing said magnet, the supporting means for said unitary coil assemblies, said panels, said receptacle-means, and said input connector means, said casing having an opening to the exterior from said supporting means whereby said multiple galvanometer comprises a unitary assembly in which said unitary coil assemblies may readily be inserted in operative relation and withdrawn or replaced, as desired.

3. A multiple galvanometer, including: a plurality of similar, tubular, unitary, coil assemblies of circular, cross section; a magnet structure common to all of said coil assemblies; and means supporting said coil assemblies, comprising: a pair of spaced, magnetic members forming pole-pieces for said magnet structure; a first group of magnetic pole-piece segments arranged side-by-side on one of said magnetic members in the space between said members; a second group of magnetic pole-piece segments arranged in said space side-by-side on the other of said magnetic members with a pole-piece segment of said second group spaced from but disposed oppositely to an individually associated pole-piece segment of said first group to form a plurality of separate magnetic gaps, one individual to each of said tubular coil assemblies and in which the latter are inserted when in operative relationship with said magnet; means supporting each of said oppositely disposed pairs of pole-piece segments to be independently adjustable in position about an axis parallel to a line connecting them; separate means for so adjusting each of said oppositely disposed pairs of pole-piece segments, a casing for said galvanometer, said pole-piece segments being disposed between opposite side walls of said casing; and means interlocking said pole-piece segments and supporting them for adjustment in said casing, comprising: cooperating, circular projections and grooves on the said opposite side walls and on the said pole-piece segments adjacent said side walls, and cooperating, circular projections and grooves on the said pole-piece segments adjacent one another, whereby said segments are interlocked with each other and retained in said casing while permitting independent adjustment in position about said axis of related oppositely-disposed segments.

4. A multiple galvanometer as specified in claim 3 in which said tubular unitary coil assembly is an elongated tube structure of circular cross section, and in which the space between each of said oppositely disposed magnetic segments comprises a circular opening of mating dimensions whereby each of said tubular structures snugly fits in and is frictionally retained in its associated opening.

5. A multiple galvanometer as specified in claim 4 in which each of said tubular unitary coil assemblies comprises an elongated coil supported for deflection between spaced points by suspension wires and includes a pair of connector rings for said coil provided at one end of said tubular structure, an individual pair of elongated collector brushes supported by said magnet and cooperatively related to each pair of slip-rings for connecting each of said coils to an external circuit.

6. A multiple galvanometer as specified in claim 5 including damping resistors for each of said tubular unitary coil assemblies mounted on an individual panel, each of said panels having plug-in type connecting means, and receptacle means for said panels, said receptacle means having mating connecting means and providing a connector from each individually associated tubular coil assembly and panel to a separate external circuit.

7. A multiple galvanometer as specified in claim 6 including plug-in type input connector means for all of said tubular unitary coil assemblies, said input connector means being operatively connected to said receptacle and including separate electrical contacts adapted for connection to a plurality of external circuits, and a casing for housing said magnet, the supporting means for said unitary coil assemblies, said panels, said receptacle-means, and said input connector means, said casing having an opening to the exterior from said supporting means whereby said multiple galvanometer comprises a unitary assembly in which said unitary coil assemblies may readily be inserted in operative relation and withdrawn or replaced, as desired.

References Cited in the file of this patent

UNITED STATES PATENTS

| | | |
|---|---|---|
| 2,268,526 | Palmer | Dec. 30, 1941 |
| 2,389,081 | Redmond | Nov. 13, 1945 |
| 2,425,407 | Washburn | Aug. 12, 1947 |
| 2,439,576 | Morrow | Apr. 13, 1948 |
| 2,469,265 | Hathaway | May 3, 1949 |
| 2,571,776 | Staff | Oct. 16, 1951 |
| 2,611,807 | Lazzery | Sept. 23, 1952 |
| 2,698,417 | Hathaway | Dec. 28, 1954 |